United States Patent [19]
Nakazeki et al.

[11] Patent Number: 5,260,965
[45] Date of Patent: Nov. 9, 1993

[54] LASER PROCESSING APPARATUS AND LASER PROCESSING METHOD

[75] Inventors: Tsugito Nakazeki; Tomoshige Kobayashi, both of Shizuoka, Japan

[73] Assignee: NTN Corporation, Osaka, Japan

[21] Appl. No.: 785,953

[22] Filed: Oct. 31, 1991

[30] Foreign Application Priority Data

Dec. 19, 1990 [JP] Japan .................................. 2-403563
May 30, 1991 [JP] Japan .................................. 3-126295

[51] Int. Cl.$^5$ .............................................. H01S 3/08
[52] U.S. Cl. .............................................. 372/108
[58] Field of Search ................... 372/108, 109, 705; 359/350, 355, 356, 362, 368, 379, 380, 381, 798

[56] References Cited
U.S. PATENT DOCUMENTS
4,769,530 9/1988 Miyahara ........................ 359/380 X

*Primary Examiner*—Rodney B. Bovernick
*Assistant Examiner*—Robert E. Wise
*Attorney, Agent, or Firm*—Lowe, Price, LeBlanc & Becker

[57] ABSTRACT

In a laser processing apparatus according to the present invention, an aberration compensating device is provided between a beam forming section and a half mirror. The compensating device makes a focal point of visible light used as reference light during observation and a focal point of infrared laser light used during processing coincide with each other. In one embodiment of the aberration correcting device includes an aberration correcting convex lens having long focal length and a space portion provided in a rotatable lens holder. When observing an object to be processed, the lens holder is rotated to bring the space portion into an optical path. During processing, the lens holder is rotated to bring the convex lens for correction into the optical path, e.g. when emitting the laser beam. The laser beam is converged until incidence on the objective lens by the convex correcting lens to correct the aberration. As the aberration compensating device, a combination of a concave lens and a convex lens having different refractive indexes and the same focal length may also be employed. Otherwise, a concave lens may be provided to make a beam waist of the laser beam coincide with the portion to be processed.

4 Claims, 4 Drawing Sheets

LASER PROCESSING APPARATUS AND LASER PROCESSING METHOD

BACKGROUND OF THE INVENTION

1. Field of the Invention

The present invention relates to laser processing apparatus and laser processing methods. More particularly, the present invention relates to a laser processing apparatus and a laser processing method in which fine processings are performed with a laser beam while a processed surface is observed with a microscope.

2. Description of the Background Art

FIG. 1 is a vertical section of a conventional laser processing apparatus, and FIG. 2 is a diagram for describing a processing method in the case where glass is provided above a surface of an object to be processed in the conventional laser processing apparatus.

Referring to FIG. 1, the laser processing apparatus includes a microscope portion 1, a beam section forming device 2, an optical coupling device 3, a laser oscillator 4, a light source 5 and an observing portion 7. Microscope portion 1 constitutes a microscope of so-called infinite lens-barrel type, in which an objective lens 1b is attached to the lower end portion of lens-barrel 1a. A lens 1c for collimating light from a focal point outside the objective lens 1b and a lens 1d for converging the collimated light in turn are provided above objective lens 1b. Furthermore, in microscope portion 1, a first half mirror 1e is provided above lens 1d with an angle of approximately 45° with respect to the optical axis of these lenses, and an observing portion 7 is provided on the right side of half mirror 1e in the drawing.

The upper end portion of lens-barrel 1a is opened, and the beam section forming device 2 is coupled thereto. Beam section forming device 2 is cylindrical-shaped as is lens-barrel 1a. The beam section forming device 2 includes a main body 2a provided on the upper end portion of lens-barrel 1a and a light shielding plate 2b provided in main body 2a perpendicular to the center axis of main body 2a. Light shielding plate 2b has an opening 2c at its central portion. Although not shown in the figure, the shape of opening 2c can be arbitrarily changed.

Optical coupling device 3 is coupled to the upper end portion of beam section forming device 2. Optical coupling device 3 includes a main body 3a, a second half mirror 3b, a collimator portion 3c and a correction plate 3d. Main body 3a is cylindrically shaped to correspond to main body 2a of the beam section forming device 2. Second half mirror 3b is provided inside main body 3a with an angle of 45° with respect to the central axis of the main body 3a. Collimator portion 3c is provided on the left side of half mirror 3b for collimating the light from the light source 5, and correction plate 3d is provided above half mirror 3b. Laser oscillator 4 is coupled to the upper end portion of main body 3a, and laser beam r1 is emitted from a laser device 4a therein.

Furthermore, reference light r2 is emitted from an optical source 5 and is transmitted to collimator portion 3c through an optical fiber 5a. The laser beam r1 passes through correction plate 3d and second half mirror 3b. After collimation, the reference light r2 is reflected downward by the second half mirror 3b. Both the beam r1 and the reference light r2 follow a common optical path r. Light source 5 includes a tungsten halogen lamp and a film for changing white light produced by the tungsten halogen lamp into distinguishable monochromatic light.

In laser processing with a laser processing apparatus configured as described above, an object 6 to be processed is provided in the vicinity of objective lens 1b of microscope portion 6a which is 1 and a portion to be processed is optically enlarged and observed through observing portion 7. Next, a spot of reference light r2 is formed at the portion 6a to be processed changing the shape of opening 2c in the beam section forming device 2 while an operator observes the spot shape appearing on portion 6a with the microscope, allows the operator to select the spot shape needed for a desired processing. Subsequently, laser beam r1 is emitted from laser device 4a of laser oscillator 4. The emitted laser light r1 is thus converged as a spot having substantially same shape as the spot of the reference light on the portion 6a to be processed by the objective lens 1b, and the desired processings are performed.

In the conventional laser processing apparatus configured as described above, visible light is seen in the observation portion 7. The reference light r2 for irradiating the object 6 to be processed and indicating the spot shape is also visible light. On the other hand, if the laser light r1 used for processings is emitted from YAG or $CO_2$ type laser device of laser light r1 is in the near infrared or far infrared range, respectively. If the chromatic aberration is corrected in the respective wavelength ranges in the optical system at the portion where visible light and laser beam pass through, there is no problem.

However, when objective lenses 1b, 1c have to be for use only for visible light, and when an object to be processed is a liquid crystal display, for example, a glass is provided above the electrode pattern as shown in FIG. 2, so that the light which passes through objective lenses 1b, 1c only for use for visible light forms an image at position P2 as shown by the broken line in FIG. 1 even if focusing on an electrode pattern as an object 6. This is because the refractive index of the laser beam r1 having long wavelength is made small. Accordingly, a precise processed shape cannot be formed on the surface of object 6.

In the case shown in FIG. 2, even if objective lenses 1b and 1c are capable of dual use for visible light and infrared light, even if focusing on the surface of object 6 with visible light, the focal point of the infrared light (i.e. the laser beam) is at P3 because of the presence of the glass plate 8 above the surface of object to be processed. The result is that a precise processed shape still cannot be formed on the surface of object 6.

SUMMARY OF THE INVENTION

Accordingly, it is a main object of the present invention to provide a laser processing apparatus and a laser processing method in which the difference in the refractive index of objective lenses can be corrected so that a focal point of visible light coincides with a focal point of infrared light.

Briefly stated, in the present invention, reference light and the laser beam for processings are guided to a common optical path through an objective lens of a microscope for enlarging and observing a portion to be processed of an object and converging light at the portion to be processed. The spot shape of the reference light at the portion to be processed is observed with the a microscope before processing with laser beam. Cross sectional shapes of the reference light and the laser beam are controlled by the shape of an opening or aperture through which they pass. The aberration is corrected so that in processings the laser beam for processings is focused on the position in the optical axis direction the same as is the reference light during observation.

Accordingly, the difference in the refractive index of an objective lens can be corrected so that a focal point of a visible reference light and a focal point of an infrared laser beam light coincide with each other.

In a preferred embodiment, an aberration correcting lens is held by a rotatable lens holder. During processing the holder is rotated to a position whereby the laser beam passes through the aberration correcting lens. During observation the correcting lens is rotated out of the light path so that the reference light passes through a space.

According to the preferred embodiment of the present invention, the aberration at the time when laser beam passes through an objective lens can be corrected during processing by rotating the lens holder to insert the correcting near in the seam path.

Furthermore, according to a more preferable embodiment of the present invention, the aberration of an objective lens is corrected with a correction lens in which concave and convex lenses of different materials are combined so that the focal length in the visible light range is large and that for the infrared light is short.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
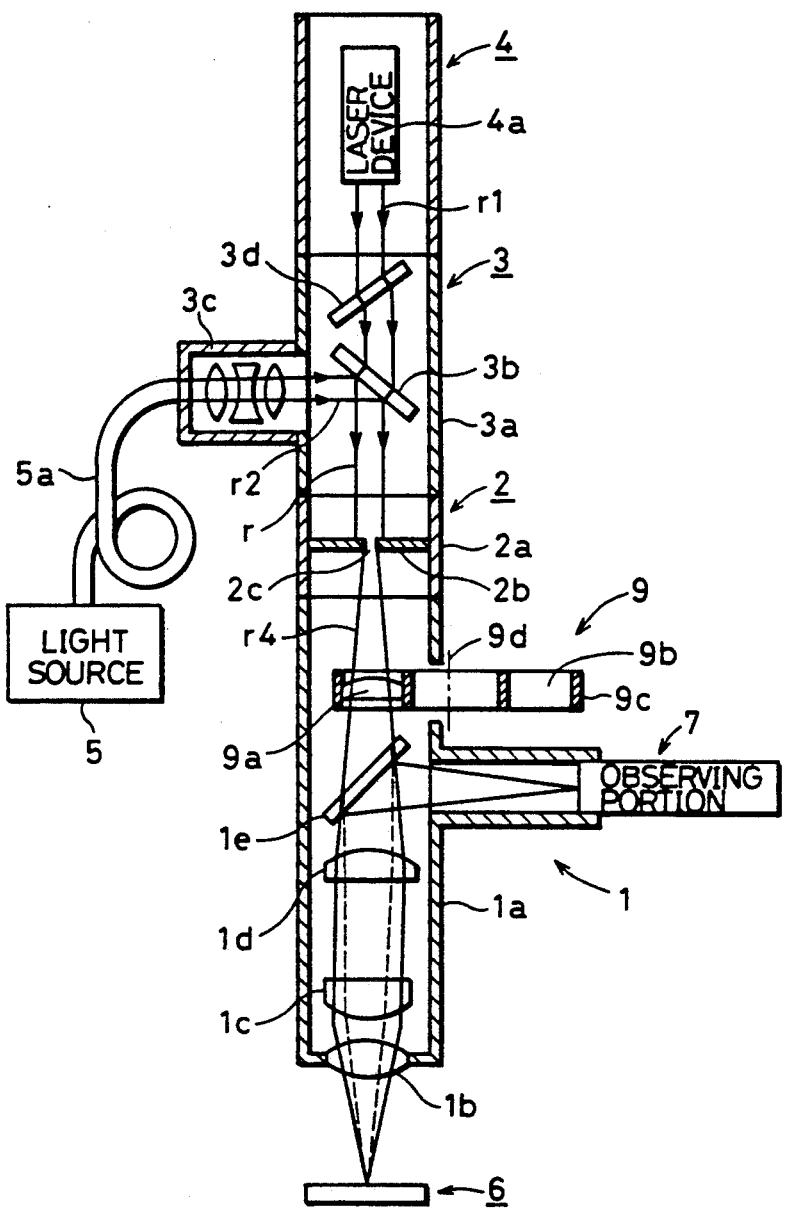
FIG. 3 is a vertical section of one embodiment of the present invention.
Figure 4:
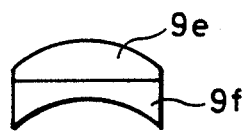
FIG. 4 is a diagram showing a lens for correction in another embodiment of the present invention.

FIG. 3 is a vertical section of one embodiment of the present invention, and FIG. 4 is a diagram illustrating one example of a lens for correction.

Figure 1:
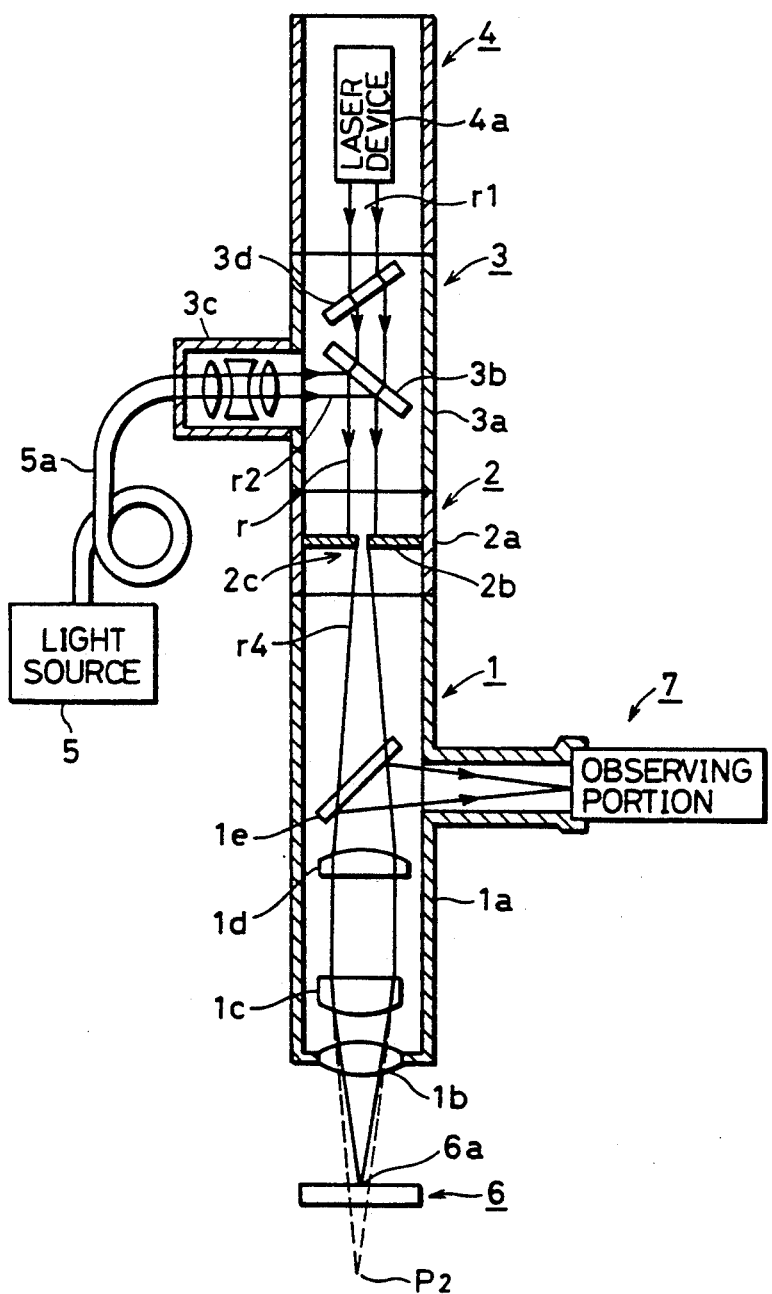
FIG. 1 is a vertical section of a conventional laser processing apparatus.
Figure 2:
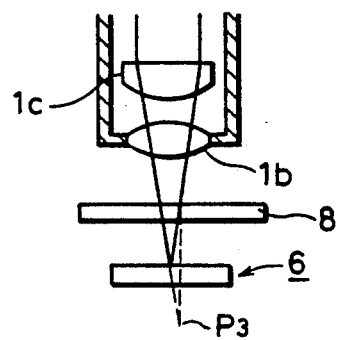
FIG. 2 is a diagram showing an example in which a glass plate is interposed between a conventional laser processing apparatus and an object to be processed.

The embodiment shown in FIG. 3 is similarly constituted to the laser processing apparatus shown in FIG. 1 described above, except for the following points. That is to say, an aberration compensating device 9 is provided between a beam section forming device 2 and a half mirror 1e for making a focal point of visible light and a focal point of infrared light coincide with each other. Aberration compensating device 9 includes a lens holder 9c which is rotatable around a central axis 9d parallel to the optical axis of an objective lens 1b. A convex lens 9a for correcting aberration with has a long focal length and is supported in the lens holder 9c. The lens holder 9c also has a space portion 9b.

When observing an object to be processed 6, lens holder 9c is rotated to bring space portion 9b into the optical path, and normal operation is performed. When emitting laser beam, lens holder 9c is rotated so that convex lens 9a for correction comes into the optical path. Thus, the infrared laser beam which passes through convex lens 9a for aberration correction and is converged until incidence on objective lenses 1b, 1c as shown by the broken line. The focal point of the converged laser beam (using lens 9a) coincides with the focal point for observation wherein light passes only through objective lenses 1b, 1c (not 9a), resulting in obtaining precise processed shape. Needless to say, the same effect can be obtained, providing aberration compensating device 9 between lens 1d and first half mirror 1e.

The convex lens 9a for aberration correction corrects for difference in the refractive indexes in objective lenses 1b, 1c of with respect to visible light and infrared light, of which refractive index ratio is approximately 0.5% (when using YAG laser).

In the embodiment described above, lens holder 9c must be rotated every time between observation and laser light emission. FIG. 4 shows an embodiment in which the troublesome problem is solved. The lens for aberration correction shown in FIG. 4 is made of combination of a convex lens 9e and a concave lens 9f having different refractive indexes and the same focal length. When employing general optical glass as material of convex lens 9e, the refractive index at the wavelength of 546.1 nm is 1.5187, and the refractive index with the wavelength of 1064 nm is 1.50669.

On the other hand, using zinc selenide as the concave lens 9, the refractive index with the wavelength of 546.1 nm is 2.705 and the refractive index with the wavelength of 1064 nm is 2.488. Appropriately combining these two kinds of convex lens 9e and concave lens 9f made of different materials, a compound lens in which the focal length is long with visible light and it is short with infrared light can be obtained. Using such a compound lens formed of convex lens 9e and concave lens 9f as lens 9a for correction shown in FIG. 3, since the focal length with visible light is long, change of optical path by lens 9a for correction is small and the change is large with infrared light. That is, in the embodiment shown in FIG. 3, the lens holder 9c does not have to be rotated every time when observing and when emitting laser light, and the focal points can be well coincided with each other in any case.

Figure 5:
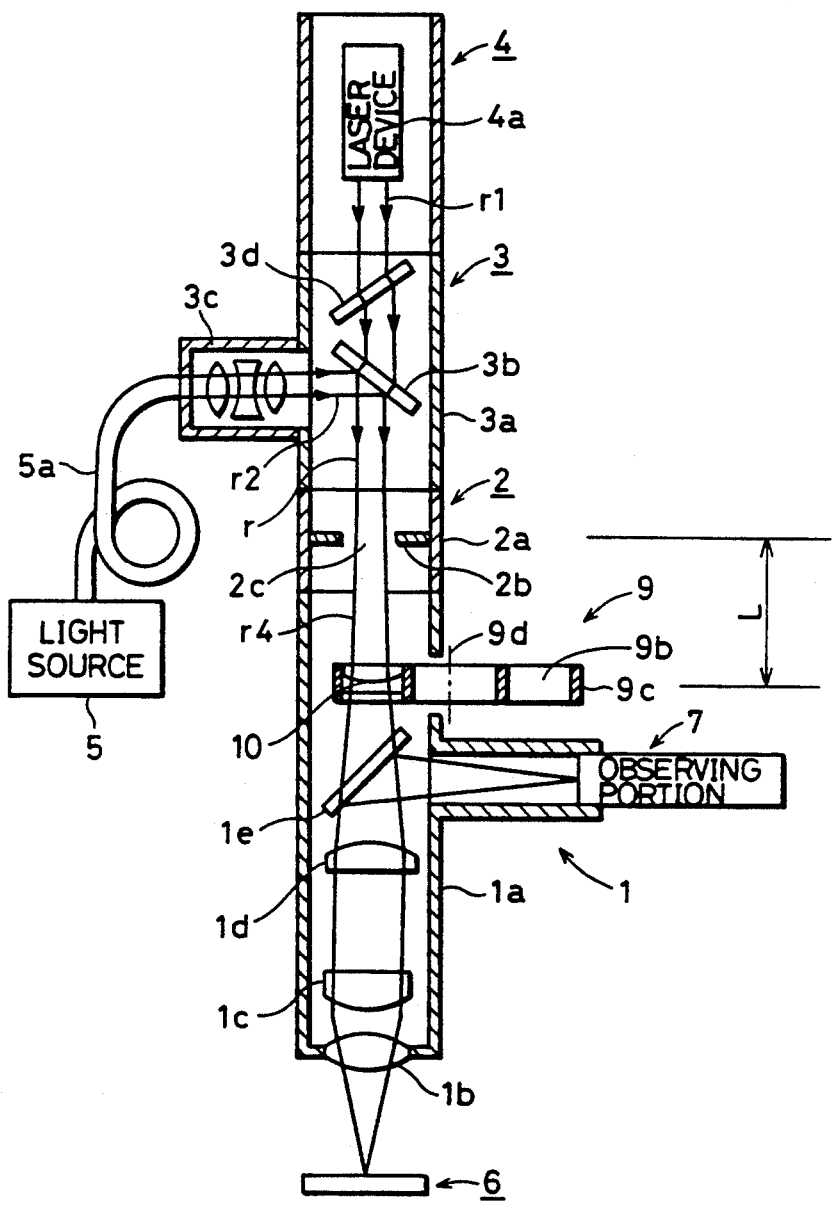
FIG. 5 is a vertical section showing still another embodiment of the present invention.

FIG. 5 is a diagram showing yet another embodiment of the present invention. In the embodiment shown in FIG. 5, a beam waist portion coincides with a processed portion to enable processings with minimized processing dimensions. In order to decrease the processing dimensions to several $\mu$m or smaller, it is necessary to make the beam waist portion of the laser beam coincide with the processed portion. Accordingly, in the embodiment shown in FIG. 5, a concave lens 10 having focal length L is attached to a lens holder 9. Providing concave lens 10 in the optical path, the light incident upon concave lens 10 passes through concave lens 10 and then passes on the optical path expressed with a normal image forming optical system, so that the beam waist coincides with a processed portion on the surface of object to be processed 6. At this time, with an opening of main body portion 2a of beam section forming device 2 completely opened so that all the laser beam r1 from laser oscillator 4 can pass therethrough, the light can be effectively utilized.

When the power of laser oscillator 4 is too large, a filter for attenuation (not shown) may be inserted between optical coupling device 3 and laser oscillator 4.

As described above, according to embodiments of the present invention, a lens for correction is provided between objective lens 1b of a microscope and a beam section forming device 2, where the laser beam passes through the lens for correction in processing, and a focal point of visible light and a focal point of infrared light can be coincided with each other.

Furthermore, in the embodiment shown in FIG. 5, the beam waist of laser beam is located at a portion to be processed to enable processings to possibly be minimized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for processing an object by irradiating a laser beam onto the object, comprising:
   a microscope including an objective lens at a distal end for optically enlarging and observing a portion of said object;
   a laser beam source for radiating the laser beam through said objective lens toward said object during processing of said object;
   a reference light source for radiating reference light through said objective lens for observing said portion of said object through said microscope;
   optical coupling means for leading the laser beam from said laser beam source and the reference light from said reference light source to an optical axis of the objective lens;
   beam forming means provided between said optical coupling means and said objective lens and having an opening corresponding to a desired beam spot shape; and
   correcting means provided between said objective lens and said forming means for correcting for differences in the focal characteristics of the microscope with respect to the laser beam and the focal characteristics of the microscope with respect to the reference light such that the laser beam and the reference light focus at a common point, wherein said correcting means comprises:
   (1) an aberration correcting lens for correcting aberration, and
   (2) a lens holder for rotatably holding said aberration correcting lens so that said laser beam passes through said aberration correcting lens during processing of the object and said reference light passes through a space during observation.

2. An apparatus for processing an object by irradiating a laser beam onto the object, comprising:
   a microscope including an objective lens at a distal end for optically enlarging and observing a portion of said object;
   a laser beam source for radiating an infrared laser beam through said objective lens toward said object during processing of said object;
   a reference light source for radiating visible reference light through said objective lens for observing said portion of said object through said microscope;
   optical coupling means for leading the infrared laser beam from said laser beam source and the visible reference light from said reference light source to an optical axis of the objective lens;
   beam forming means provided between said optical coupling means and said objective lens and having an opening corresponding to a desired beam spot shape; and
   a correction lens comprising a convex lens of a first material and a concave lens of a second material different from the first material such that a focal length of the correction lens with respect to visible light is large and a focal length of the correction lens with respect to infrared light is short such that the infrared laser beam and the visible reference light focus at a common point.

3. An apparatus for processing an object by irradiating a laser beam onto the object, comprising:
   a microscope including an objective lens at a distal end for optically enlarging and observing a portion of said object;
   a laser beam source for radiating the laser beam through said objective lens toward said object during processing of said object;
   a reference light source for radiating reference light through said objective lens for observing said portion of said object through said microscope;
   optical coupling means for leading the laser beam from said laser beam source and the reference light from said reference light source to an optical axis of the objective lens;
   beam forming means provided between said optical coupling means and said objective lens and having an opening corresponding to a desired beam spot shape; and
   correcting means provided between said objective lens and said forming means for correcting for differences in the focal characteristics of the microscope with respect to the laser beam and the focal characteristics of the microscope with respect to the reference light such that the laser beam and the reference light focus at a common point, wherein said correcting means includes a concave lens for making a beam waist of said laser beam coincide with said portion of said object.

4. A method for processing an object by radiating laser light onto the object, comprising the steps of:
   directing a reference light along an optical path to an optical axis of an objective lens of a microscope and converging the reference light on a portion of said object;
   forming a spot of said reference light of a predetermined shape on the portion of said object;
   observing the spot of said reference light on the portion of said object with said microscope;
   directing a laser light along said optical path to the optical axis of the objective lens of said microscope and converging the laser light on the portion of said object;
   forming a spot of said laser light of said predetermined shape on the portion of said object;
   rotating a correcting means into the optical path of the laser light, wherein said correcting means is for correcting aberration of the laser light such that the spot of said laser light is formed at the same position as the spot of said reference light; and
   processing said object with the corrected laser light.

* * * * *